United States Patent
Shiiba et al.

(10) Patent No.: US 7,900,533 B2
(45) Date of Patent: Mar. 8, 2011

(54) CONTROL DEVICE FOR AUTOMATIC TRANSMISSION

(75) Inventors: Kazuyuki Shiiba, Toyota (JP); Seiji Kuwahara, Toyota (JP); Nobufusa Kobayashi, Chiryu (JP); Ichiro Kitaori, Nagoya (JP); Toshihiro Fukumasu, Nagoya (JP); Atsushi Yoshimura, Anjo (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 145 days.

(21) Appl. No.: 12/448,052

(22) PCT Filed: Oct. 17, 2008

(86) PCT No.: PCT/JP2008/068903
§ 371 (c)(1),
(2), (4) Date: Jun. 5, 2009

(87) PCT Pub. No.: WO2009/054329
PCT Pub. Date: Apr. 30, 2009

(65) Prior Publication Data
US 2010/0004094 A1    Jan. 7, 2010

(30) Foreign Application Priority Data
Oct. 25, 2007 (JP) .................................. 2007-277812

(51) Int. Cl.
*B60K 20/02* (2006.01)
(52) U.S. Cl. .......................... 74/473.21; 701/52
(58) Field of Classification Search ................ 701/52, 701/62; 74/336 R, 473.21; 477/120, 125, 477/904
See application file for complete search history.

(56) References Cited

U.S. PATENT DOCUMENTS

| | | | |
|---|---|---|---|
| 4,507,736 A | * | 3/1985 | Klatt ............................... 701/52 |
| 5,730,680 A | | 3/1998 | Toukura |
| 5,882,277 A | | 3/1999 | Iizuka |
| 6,080,083 A | * | 6/2000 | Nishino ........................ 477/125 |

(Continued)

FOREIGN PATENT DOCUMENTS

DE   196 41 059 A1   4/1997

(Continued)

OTHER PUBLICATIONS

German Office Action issued Aug. 12, 2010 in German Patent Application No. 11 2008 003 136.3-14 (with translation).

*Primary Examiner* — David D Le
*Assistant Examiner* — Derek D Knight
(74) *Attorney, Agent, or Firm* — Oliff & Berridge PLC

(57) ABSTRACT

A controller of an automatic transmission can be set to be in a first control mode and a second control mode for controlling a transmission gear ratio of the automatic transmission. The controller in the second control mode automatically changes the transmission gear ratio. The controller obtains an index value and upper limit speed of rotation speed of a transmission output shaft. The controller in the first control mode allows the transmission gear ratio to be changed when an operation member is operated to increase the transmission gear ratio and the index value is equal to or lower than the upper limit speed. The controller has a setting section that sets the upper limit speed. The setting section sets the upper limit speed based on vehicle acceleration when the controller is in the first control mode and the operation member is operated to increase the transmission gear ratio.

4 Claims, 3 Drawing Sheets

U.S. PATENT DOCUMENTS

| | | |
|---|---|---|
| 6,175,797 B1 | 1/2001 | Iizuka |
| 6,246,942 B1 | 6/2001 | Dobler et al. |
| 6,456,919 B1 | 9/2002 | Korner et al. |
| 6,514,174 B2 * | 2/2003 | Iida et al. ............... 701/52 |
| 2002/0046894 A1 | 4/2002 | Seidel et al. |
| 2007/0162210 A1 | 7/2007 | Kitaori et al. |

FOREIGN PATENT DOCUMENTS

| | | |
|---|---|---|
| DE | 197 03 561 A1 | 8/1998 |
| DE | 198 54 254 A1 | 5/2000 |
| DE | 100 52 880 A1 | 5/2002 |
| DE | 11 2005 001 876 T5 | 12/2007 |
| DE | 10 2007 055 714 A1 | 7/2008 |
| JP | A-09-257125 | 9/1997 |
| JP | A-10-089465 | 4/1998 |
| JP | A-10-089466 | 4/1998 |
| JP | A-2007-315414 | 12/2007 |

* cited by examiner

CONTROL DEVICE FOR AUTOMATIC TRANSMISSION

FIELD OF THE INVENTION

The present invention relates to a controller of an automatic transmission. The transmission gear ratio of the automatic transmission can be changed manually by a driver.

BACKGROUND OF THE INVENTION

In many cases, an automatic transmission is arranged between the output shaft of the internal combustion engine and an axle shaft of a vehicle. An ECU (electronic control unit) automatically controls the transmission gear ratio of the automatic transmission according to a vehicle running state such as an operation amount of an accelerator and a vehicle speed.

For example, in some cases, a downshift switch and an upshift switch are provided on the steering wheel to allow the driver to change the transmission gear ratio manually.

When the engine speed is great and the driver manually operates to downshift, or increases the transmission gear ratio, the engine speed may be excessively high (over revolution). That is, the engine can over-rev.

In a controller disclosed in Patent Document 1, when the engine speed is greater than a predetermined upper limit speed, change of the transmission gear ratio is inhibited. That is, the controller does not downshift even if the driver manually operates to downshift. Accordingly, an engine overspeed is avoided.

Generally, a little time difference occurs between the time when the driver manually operates to request to change the transmission gear ratio and the time when the transmission gear ratio is actually changed. Even during such a transmission gear ratio changing period, the engine speed change from moment to moment. That is, during a transmission gear ratio changing period, the changing state of the engine speed is not constant. Therefore, to prevent an engine overspeed in every case, it is necessary to set the upper limit speed to be small. That is, the engine upper limit speed is set to be small to allow a margin.

However, setting the engine upper limit speed to be small to allow a margin reduces the vehicle operational region in which downshift is allowed, which lowers the vehicle maneuverability.

Patent Document 1: Japanese Laid-Open Patent Publication No. 10-89466

DISCLOSURE OF THE INVENTION

An objective of the present invention is to inhibit the occurrence of engine overspeed and secure (expand) the vehicle operational region in which downshift by a manual operation is allowed.

The present invention provides a controller of an automatic transmission. The controller can be set to be in a first control mode or a second control mode for controlling a transmission gear ratio of the automatic transmission device. The controller automatically changes the transmission gear ratio when in the second control mode. The automatic transmission is mounted in a vehicle. The vehicle has an internal combustion engine, an axle, and an operation member. The internal combustion engine has an engine output shaft. The automatic transmission has a transmission output shaft. The controller obtains an index value and upper limit speed of rotation speed of the transmission output shaft. The automatic transmission is provided between the engine output shaft and the axle. In the first control mode, the controller allows the transmission gear ratio to be changed if the operation member is operated to increase the transmission gear ratio and the index value is equal to or smaller than the upper limit speed. The controller has a setting section for setting the upper limit speed. When controller is in the first control mode and the operation member is operated to increase the transmission gear ratio, the setting section detects vehicle acceleration of the vehicle and sets the upper limit speed based on the vehicle acceleration.

DETAILED DESCRIPTION OF THE PREFFERED EMBODIMENTS

Figure 1:
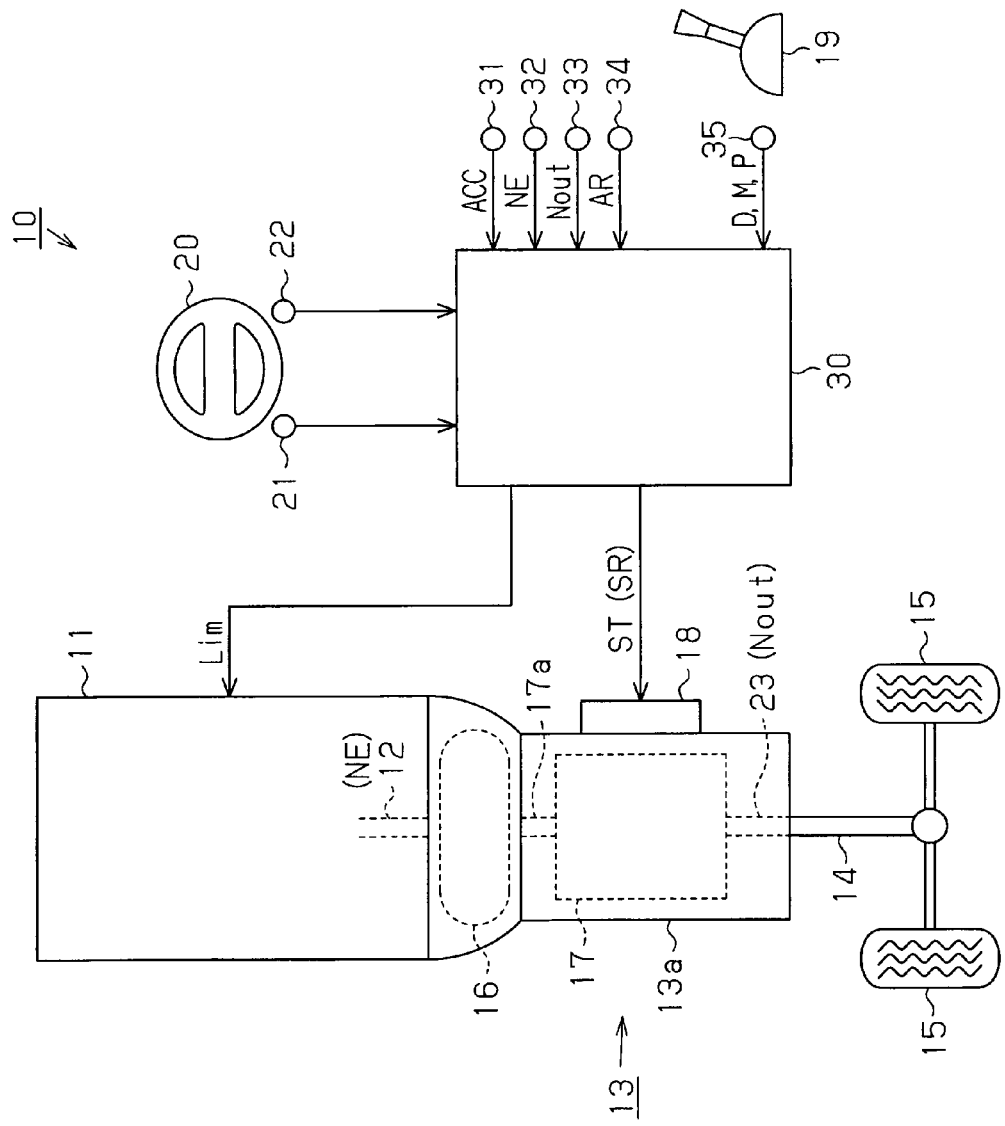
FIG. 1 is a block diagram showing a vehicle having a controller of one embodiment of the present invention.
Figure 2:
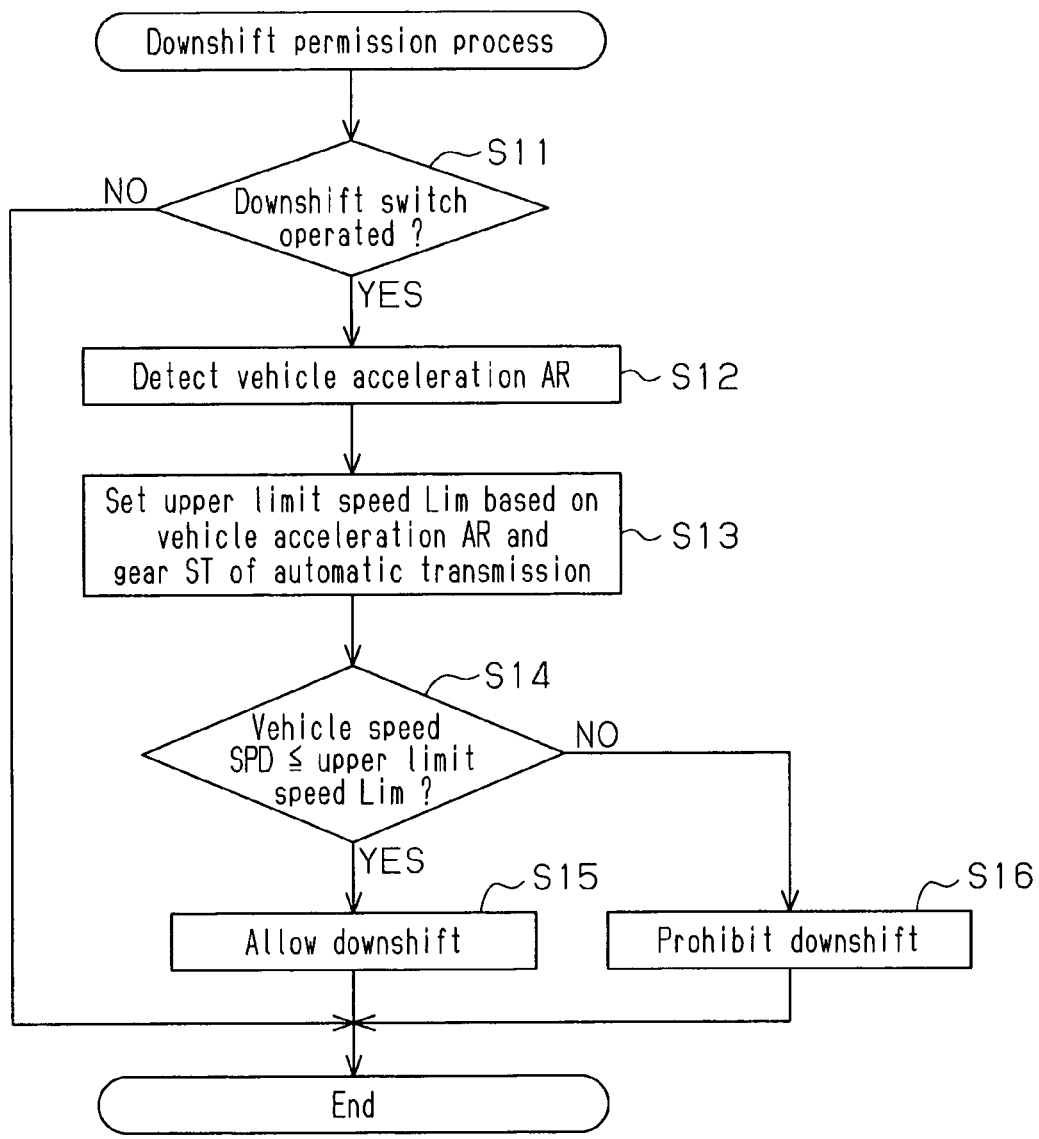
FIG. 2 is a flowchart of a downshift permission process executed by the ECU of FIG. 1.
Figure 3:
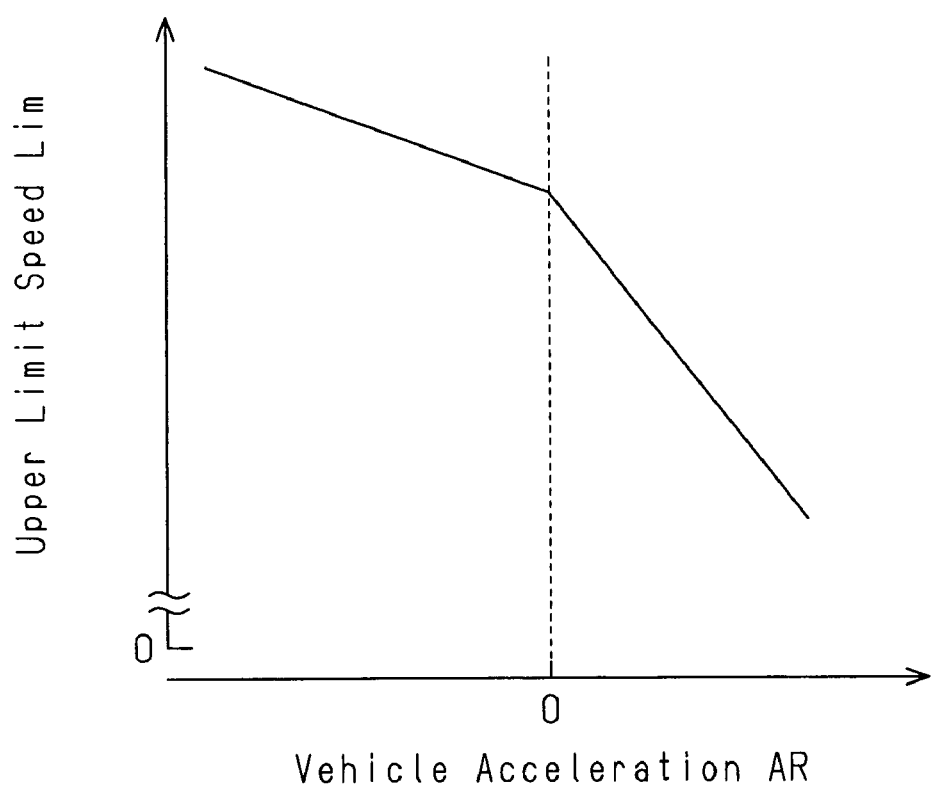
FIG. 3 is a shift map stored in the ECU of FIG. 1, showing the relationship between a vehicle acceleration and an upper limit speed.

FIGS. 1 to 3 show one embodiment of the present invention. As shown in FIG. 1, a vehicle 10 has an engine 11, an automatic transmission 13, drive wheels 15, a shift lever device 19, a steering wheel 20, and an ECU (electronic control unit) 30. The ECU 30 is a controller of the automatic transmission 13.

A crankshaft 12 is an output shaft extending from the engine 11, which is an internal combustion engine. The rotation of the crankshaft 12 is changed by the automatic transmission 13. The automatic transmission 13 has a transmission output shaft 23, which is an output shaft. The rotation of the transmission output shaft 23 is transmitted to the drive wheels 15 through an axle shaft 14.

The automatic transmission 13 has a casing 13a. The casing 13a accommodates a torque converter 16 and a planetary gear train 17. That is, the rotation of the crankshaft 12 is transmitted to the drive wheels 15 through the torque converter 16, the planetary gear train 17, and the axle shaft 14 in order. The planetary gear train 17 has a plurality of planetary gears.

The automatic transmission 13 is a multistage type having a plurality of gears ST. The automatic transmission 13 of the present embodiment has eight forward gears including first gear to eighth gear. The transmission gear ratio SR is reduced from the first gear to the eighth gear. That is, the transmission gear ratio SR in the eighth gear is smaller than the transmission gear ratio SR in the first gear. The eighth gear is higher speed gear than the first gear. The first gear represents the smallest transmission gear ratio SR and the eighth gear represents the largest transmission gear ratio SR. That is, the first gear is the lowest speed gear ST and the eighth gear is the highest speed gear ST. The gear is downshifted when the transmission gear ratio is changed from the eighth gear toward the first gear. When the gear is downshifted, the gear ST is changed to be lower and to increase the transmission gear ratio SR. On the other hand, the gear is upshifted when the transmission gear ratio is changed from the first gear toward the eighth gear. When the gear is upshifted, the gear ST is changed to be higher and to reduce the transmission gear ratio SR.

The automatic transmission 13 has a plurality of clutch devices. Each clutch device has an electromagnetic valve that is a switch valve and a multi-plate hydraulic clutch mechanism. Each hydraulic clutch mechanism is provided in the automatic transmission 13. Each hydraulic clutch mechanism switches a state of one of a plurality of gears of the planetary gear train 17 between a fixed state and a released state with respect to the casing 13a or with respect to an input shaft 17a of the planetary gear train 17. In other words, each hydraulic clutch mechanism switches the state of the gear of the planetary gear train 17 between a coupled state and a non-coupled state with respect to the casing 13a or with respect to the input shaft 17a.

A control valve 18 is provided to the automatic transmission 13. Each switching valve is provided to the control valve 18. The control valve 18 has a hydraulic circuit therein. For example, when the ECU 30 switches the state of the switching valve between an excited state and a de-excited state, a hydraulic path of the hydraulic circuit is switched. As a result, the state of each hydraulic clutch mechanism is switched between an engaged state and a released state. Accordingly, the gear ST is changed.

Electromagnetic valves that are two regulator valves are provided to the control valve 18 other than the switching valves. The pressure of oil that is supplied to the hydraulic clutch mechanism is controlled by controlling an opening degree of the regulator valves.

A shift lever device 19 is provided in the vicinity of a driver's seat of the vehicle 10. For example, a driver can switch the operation position of the shift lever device 19 manually. The operation position of the shift lever device 19 includes a parking position (P position), a reverse position (R position), a neutral position (N position), an automatic transmission position (D position) and a manual transmission position (M position). The P position and the N position are selected when the vehicle 10 is stopped. The R position is selected when the vehicle 10 moves backward. The D position and the M position are selected when the vehicle 10 moves forward.

The D position is selected when the driver selects an automatic transmission mode. The M position is selected when the driver selects a manual transmission mode. In the automatic transmission mode, the ECU 30 automatically switches the gear ST according to the vehicle running state. In the manual transmission mode, the driver switches the gear ST manually.

A steering wheel 20 is provided at the driver's seat. An upshift switch 21 and a downshift switch 22 are provided on the steering wheel. The upshift switch 21 and the downshift switch 22 are operation members that are operated to change the forward gears manually. Every time the upshift switch 21 is operated once, a signal for upshifting the gear ST is transmitted to the ECU 30. On the other hand, every time the downshift switch 22 is operated once, a signal for downshifting the gear ST is transmitted to the ECU 30.

The ECU 30 switches the state of the electromagnetic valve of the automatic transmission 13 according to the selected position of the shift lever device 19 to switch the gear ST. The ECU 30 controls the automatic transmission 13 to disconnect the crankshaft 12 and the drive wheels 15 when the shift lever device 19 is in the N position or the P position. On the other hand, the ECU 30 switches the automatic transmission 13 to the reverse gear when the shift lever device 19 is in the R position. The ECU 30 switches the automatic transmission 13 to one of the first gear to the eighth gear when the shift lever device 19 is in the D position or the M position.

When the shift lever device 19 is in the D position, the ECU 30 automatically switches the forward gear according to the running state of the vehicle. The running state of the vehicle includes the vehicle speed SPD and the accelerator operation amount ACC. The accelerator operation amount ACC represents a depressed amount of the acceleration pedal. The ECU 30 selects the forward gear based on a shift map that is previously stored. The shift map shows upshift lines and downshift lines. The upshift lines and the downshift lines are shift lines that are determined by relationship between the vehicle speed SPD and the accelerator operation amount ACC. The shift lines divide the shift map into several regions. If the vehicle operational region changes so as to cross over a shift line on the shift map, the ECU 30 switches the gear ST so as to correspond to the operational region after the crossing over. The ECU 30 selects a higher gear ST for a greater vehicle speed SPD. The ECU 30 selects a higher gear ST for a greater accelerator operation amount ACC. When the shift lever device 19 is in the D position, the automatic transmission mode of the automatic transmission 13 is referred to as a second control mode.

On the other hand, when the shift lever device 19 is in the M position and the driver operates the upshift switch 21 or the downshift switch 22, the ECU 30 attempts to switch the forward gear. When the shift lever device 19 is in the M position and the downshift switch 22 is operated, the control mode of the automatic transmission 13 is referred to as a first control mode. That is, the first control mode indicates a state which the downshift switch 22 is operated in the manual transmission mode.

The ECU 30 inhibits the occurrence of the shift shock and switches the gear ST smoothly, when the shift lever device 19 is in any one of the D position and the M position. In other words, when switching the forward gear, the ECU 30 changes the state of one of the clutch mechanisms from the engaged state to the released state and changes another clutch mechanism from the released state to the engaged state. In other words, the ECU 30 carries out the transmission control by achieving the released clutch mechanism and the engaged clutch mechanism at the same time. Therefore, the ECU 30 controls oil pressure of oil that is supplied to the released clutch device and oil pressure of oil that is supplied to the engaged clutch device by controlling the open degree of the regulator valve.

An acceleration pedal sensor 31, a first rotation speed sensor 32, a second rotation speed sensor 33, an acceleration sensor 34 and a shift position sensor 35 are provided to the vehicle 10. The acceleration pedal sensor 31 detects the accelerator operation amount ACC. The first rotation speed sensor 32 detects rotation speed of the crankshaft 12, or the engine speed NE. The second rotation speed sensor 33 detects transmission rotation speed Nout. The transmission rotation speed Nout is rotation speed of a transmission output shaft 23. The acceleration sensor 34 is used for computing vehicle acceleration AR. The shift position sensor 35 detects an operated position of the shift lever device 19. The ECU 30 of the present embodiment obtains the vehicle speed SPD based on the transmission rotation speed Nout.

The vehicle 10 is provided with an ECU (electronic control unit) 30 that is comprised of a microcomputer. The ECU 30 receives output signals from the sensors 31 to 35, the upshift switch 21 and the downshift switch 22. The ECU 30 executes various computation based on the output signals and controls the engine 11 and the automatic transmission 13 based on the computation result.

The ECU 30 executes a downshift permission process shown in FIG. 2. The downshift permission process prevents overrev of the engine when the gear is downshifted. The overrev of the engine is a phenomenon that the rotation speed of the crankshaft 12 exceeds the allowed rotation speed when the gear ST is a lower speed gear.

FIG. 2 shows a flowchart of the downshift permission process. The ECU 30 executes the downshift permission process every predetermined cycle on condition that the shift lever device 19 is selected to be in the M position.

As shown in FIG. 2, the ECU 30 determines whether the downshift switch 22 has been operated (step S11). The ECU 30 temporally terminates the process when determining that the downshift switch 22 has not been operated (NO in step S1).

On the other hand, when determining that the downshift switch 22 is operated (YES in step S11), the ECU 30 detects the vehicle acceleration AR (step S12). The ECU 30 sets upper limit speed Lim with reference to the shift map based on the detected vehicle acceleration AR and the detected gear ST (step S13). The ECU 30 sets the upper limit speed Lim using the gear ST, supposing that the gear ST has been switched according to the operation of the downshift switch 22. The ECU 30 that executes step S13 functions as a setting section.

The shift map is used for computing the upper limit speed Lim, and the ECU 30 previously stores the shift map. The shift map is generated by obtaining through experiments the relationship between the vehicle operational region, which is determined by the vehicle acceleration AR and the gear ST, and the upper limit of the speed SPD that prevents the overrev of the engine after switching of the transmission gear ratio.

FIG. 3 shows one example of the relationship between the upper limit speed Lim and the vehicle acceleration AR of the shift map. As shown in FIG. 3, the smaller the vehicle acceleration AR, the greater the upper limit speed Lim becomes. The upper limit speed Lim is reduced as the vehicle acceleration AR increases. That is, the relationship between the upper limit speed Lim and the vehicle acceleration AR is represented by a polygonal line graph going down toward the right side. The absolute value of the graph inclination of the upper speed Lim when the vehicle acceleration AR is positive is greater than the absolute value of the graph inclination of the upper limit speed when the vehicle acceleration AR is negative. That is, the graph of the upper limit speed Lim more abruptly drops during vehicle acceleration than during vehicle deceleration.

In other words, during vehicle acceleration, the upper limit speed Lim is set to be greater as the absolute value of the vehicle acceleration AR becomes smaller. On the other hand, during vehicle deceleration, the upper limit speed Lim is set to be greater as the absolute value of the vehicle acceleration AR or as the deceleration of the vehicle speed becomes greater. The shift map has the relationship between the vehicle acceleration AR and the upper limit speed Lim shown in FIG. 3 for every gear ST (the first gear to the eighth gear). The upper limit speed Lim is set to be smaller as the gear ST after the switching becomes lower, that is, as the transmission gear ratio SR becomes greater.

The ECU 30 determines whether the vehicle speed SPD is equal to or lower than the upper limit speed Lim after setting the upper limit speed Lim (step S14 in FIG. 2).

The ECU 30 allows the gear to be downshifted (step S15) when the vehicle speed SPD is equal to or lower than the upper limit speed Lim (YES in step S14). That is, the ECU 30 determines that the overrev of the engine will not occur even if the gear ST is changed. Therefore, the ECU 30 downshifts the gear ST.

On the other hand, the ECU 30 prohibits the gear from being downshifted (step S16) when the vehicle speed SPD is greater than the upper limit speed Lim (NO in step S14). That is, the ECU 30 determines that there is great possibility that the overrev will occur if the gear ST is changed. Therefore, the ECU 30 does not change the gear to be lower. The ECU 30 of the present embodiment deletes the downshift request.

In other words, after the ECU 30 selectively allows or prohibits downshift of the gear based on the comparison of the vehicle speed SPD and the upper limit speed Lim, the ECU 30 temporally terminates the process.

Hereafter, advantages of the present embodiment will be explained, while comparing the embodiment with Comparative Examples.

The engine speed NE when the transmission gear ratio of the automatic transmission 13 has been changed is determined by dividing the transmission rotation speed Nout when the transmission gear ratio has been changed by the transmission gear ratio SR. A period from when the upshift switch 21 or the downshift switch 22 is operated to when the transmission gear ratio is changed is referred to as a transmission gear ratio changing period. The transmission rotation speed Nout may increase if the transmission gear ratio changing period coincides with vehicle acceleration, and the transmission rotation speed Nout may decrease if the transmission gear ratio changing period coincides with vehicle deceleration. The greater the vehicle acceleration AR, the greater the increasing degree of the transmission rotation speed Nout during the transmission gear ratio changing period becomes. On the other hand, the smaller the vehicle acceleration AR, the greater the absolute value of the reducing degree of the transmission rotation speed Nout during the transmission gear ratio changing period becomes. The greater the absolute value of the vehicle speed reducing rate, the greater the absolute value of the reducing degree of the transmission rotation speed Nout during the transmission gear ratio changing period becomes. That is, the amount of change of the transmission rotation speed Nout during the transmission gear ratio changing period changes according to the vehicle acceleration AR when the upshift switch 21 or the downshift switch 22 is operated.

When the downshift switch 22 is operated, the ECU 30 of the present embodiment allows the downshift on condition that the vehicle speed SPD is equal to or smaller than the upper limit speed Lim when the downshift switch 22 is operated.

The following Comparative Examples will now be considered. In Comparative Examples, the upper limit speed is set to be a constant value without taking the vehicle acceleration AR into consideration. That is, in Comparative Examples, the upper limit speed may be unnecessarily reduced. In other words, in Comparative Examples, the upper limit speed is set such that the engine overrev does not occur even if the transmission rotation speed Nout maximally increases in every case after the operation of the downshift switch 22. Therefore, in Comparative Examples, when the transmission rotation speed Nout is reduced during the transmission gear ratio changing period, the upper limit speed is unnecessarily small. The transmission rotation speed Nout may be reduced during the transmission gear ratio changing period if the transmission gear ratio changing period coincides with vehicle deceleration.

(1) The ECU 30 of the present embodiment sets the upper limit speed Lim according to the vehicle acceleration AR when the downshift switch 22 is operated. That is, the ECU 30 sets the upper limit speed Lim while taking into consideration the transmission rotation speed Nout when the transmission gear ratio is changed. Therefore, in the present embodiment, the upper limit speed Lim is set to be closer to the upper limit of the vehicle speed SPD that can prevent engine overrev when the transmission gear ratio is changed, compared to the Comparative Examples. Therefore, the vehicle operational region in which downshift by manual operation is permitted is secured (enlarged) while inhibiting the occurrence of overrev of the engine.

In Comparative Examples, even if the driver operates the downshift switch 22, it is often the case that the gear ST is not actually changed. In other words, the maneuverability of the vehicle may be lowered. The ECU 30 of the present embodiment inhibits the lowering of the maneuverability of the vehicle to secure (enlarge) the operational range in which the downshift can be executed by the manual operation.

(2) As shown in FIG. 3, the ECU 30 of the present embodiment sets the upper limit speed Lim to be greater as the vehicle acceleration AR when the downshift switch 22 is operated becomes smaller. Therefore, when the vehicle is accelerating, the ECU 30 sets the upper limit speed Lim such that the smaller the amount of increase of the transmission rotation speed Nout during the transmission gear ratio switching period, the greater the upper limit speed Lim becomes. That is, the ECU 30 sets the upper limit speed Lim to be greater as the transmission rotation speed Nout when the transmission gear ratio is switched becomes smaller. In other words, the ECU 30 sets the upper limit speed Lim to be greater as the upper limit of the vehicle speed SPD that prevents overrev of the engine rotation becomes greater. When the vehicle is decelerating, the ECU 30 sets the upper limit speed Lim such that the greater the amount of reduction of the transmission rotation speed Nout during the transmission rate changing period, the greater the upper limit speed Lim becomes. That is, even if the vehicle is decelerating, the ECU 30 sets the upper limit speed Lim such that the smaller the transmission device rotation speed Nout when the transmission gear ratio is changed, that is, the greater the upper limit of the vehicle speed SPD that prevents overrev of the engine rotation, the greater the upper limit speed Lim becomes.

The ECU 30 of the present embodiment sets the upper limit speed Lim according to the relationship between the vehicle acceleration AR when the downshift switch 22 is operated and the amount of change of the transmission rotating speed Nout during the transmission gear ratio changing period. That is, the ECU 30 sets the upper limit speed Lim in accordance with the transmission rotation speed Nout when the transmission gear ratio of the automatic transmission 13 is changed.

(3) The ECU 30 sets the upper limit speed Lim to be smaller as the transmission gear ratio SR when the transmission gear ratio is changed becomes greater. Therefore, compared to a case in that the upper limit speed Lim is set to be a constant value without considering the gear ST, the ECU 30 sets the upper limit speed Lim to be closer to the upper limit of the vehicle speed SPD that can prevent the occurrence of overrev of the engine rotation in the present embodiment.

For example, in some cases, if the gears ST when the transmission gear ratio is changed are different from each other, the engine rotating speed NE when the transmission gear ratio is changed is different even if the transmission rotating speed Nout and the vehicle acceleration AR when the downshift switch 22 is operated are the same. That is, if the gears ST when the transmission gear ratio is changed are different from each other, the relationship between the transmission rotating speed Nout and the engine rotating speed NE is different. That is, if the transmission device has a plurality of transmission rotating speeds Nout having the same value, the engine rotating speed NE when the transmission gear ratio is changed becomes greater as the transmission gear ratio SR becomes greater or as the gear ST becomes lower.

Suppose that the upper limit speed is set only according to the vehicle acceleration AR when the downshift switch 22 is operated without considering the transmission gear ratio SR. Specifically, suppose that the upper limit speed is set so as to prevent overrev of the engine rotation when the gear is downshifted, for example, from the second gear to the first gear. In this case, for example, when the gear is downshifted from the eighth gear to the seventh gear, when the gear downshifted from the seventh gear to the sixth gear, and when the gear downshifted from the third gear to the second gear, the upper limit speed may be unnecessarily small. When the gear is downshifted to the lowest gear, the engine speed NE when the transmission gear ratio is changed becomes greatest. That is, the upper limit speed is set to be an appropriate value when the gear is downshifted to the lowest gear. However, the allowed margin of the upper limit speed is excessively large when the gear is downshifted to a gear ST other than the lowest gear.

However, the ECU 30 of the present embodiment sets the upper limit speed Lim based on the gear ST. Supposing that the gear ST is changed according to the operation of the downshift switch 22, the ECU 30 sets the upper limit speed Lim based on the gear ST. In other words, the ECU 30 sets the upper limit speed Lim to be smaller as the transmission gear ratio SR when the transmission gear ratio is changed becomes greater. That is, the ECU 30 sets the upper limit speed Lim to be smaller as the gear ST when the transmission gear ratio is changed becomes lower, or as the engine speed NE when the transmission gear ratio is changed becomes greater. Therefore, compared to a case in that the upper limit speed Lim is set to be a constant value without considering the gear ST, the upper limit speed Lim is set to be further closer to the upper limit of the vehicle speed SPD that can prevent the occurrence of overrev of the engine rotation in the present embodiment.

Similarly, in some cased, if the gears ST after the transmission gear ratio is changed are different, the relationship between the amount of change of the vehicle speed SPD during the transmission gear ratio changing period and the amount of change of the engine speed is different even if the transmission rotation speed Nout and the vehicle acceleration AR when the downshift switch 22 is operated are the same. In other words, as the transmission gear ratio SR becomes greater, the change of the engine speed NE with respect to change of the vehicle speed SPD during the transmission gear ratio changing period becomes greater. Therefore, the greater the transmission gear ratio SR, the greater the absolute value of the reduction amount of the engine speed NE during the transmission rate changing period when the vehicle is decelerating becomes. Also, the greater the transmission gear ratio SR, the greater the amount of increase of the engine speed NE during the transmission changing period when the vehicle is accelerating becomes.

However, the ECU 30 of the present embodiment sets the upper limit speed Lim based on the gear ST. Therefore, the upper limit speed Lim is set so as to correspond to the amount of change of the engine speed NE during the transmission gear ratio changing period. That is, the ECU 30 of the present embodiment sets the upper limit speed Lim according to the gear ST so as to correspond to the engine speed NE when the transmission gear ratio is changed.

The above embodiment may be modified as follows.

The ECU 30 does not necessarily need to delete the downshift request made by the driver when the vehicle speed SPD is greater than the upper limit speed Lim. The ECU 30 may delay the execution of the downshift until the vehicle speed SPD is equal to or lower than the upper limit speed Lim.

The ECU 30 does not necessarily need to use the transmission rotation speed Nout as the vehicle speed SPD, but may obtain the vehicle speed based on the rotation speed of the drive wheels 15.

The ECU 30 may compute the vehicle acceleration AR based on the amount of change of the transmission rotation speed Nout. The ECU 30 may estimate the vehicle acceleration AR based on the accelerator operation amount ACC, the gear ST, the vehicle speed SPD, or the depressed amount of the brake pedal.

The index value of the rotation speed of the transmission output shaft 23 may be any one of the rotation speed of the axle shaft 14, the vehicle speed SPD, the rotation speed of the input shaft 17a of the planetary gear train 17, and the engine speed NE. The ECU 30 determines whether the execution of the downshift is prohibited or allowed.

The ECU 30 may previously determine three constant values for the upper limit speed and may change the upper limit speed between the three values according to the vehicle acceleration AR. The three values of the upper limit speed include a value used during vehicle deceleration (acceleration AR<0), a value used when the vehicle is normally running (acceleration AR=0), and a value used during vehicle acceleration (acceleration AR>0).

The ECU 30 may set the upper limit speed of the vehicle 10 in a sport mode to be greater than the upper limit speed in a normal mode. A driver manually operates a switch that is provided in the vicinity of a driver's seat to select the sport mode or the normal mode. In the normal mode, the transmission gear ratio SR is switched to focus on the driver's comfort. In the sport mode, the driver makes the operation to focus on the response of changing of the transmission gear ratio. In this case, the vehicle operational region in which the downshift is executed in the sport mode is set to be larger than the vehicle operational region in which the downshift is executed in the normal mode. That is, the driver easily executes the downshift in the sport mode. Therefore, the driving response quickly changes so as to correspond to the selection of the driving mode made by the driver.

The ECU 30 may set the upper limit speed Lim when the downshift is executed in the manual transmission mode (M position) to be greater than the upper limit speed Lim when the downshift is executed in the automatic transmission mode (D position). In this case, the vehicle operational region in which the downshift is executed in the manual transmission mode is larger than the vehicle operational region in which the downshift is executed in the automatic transmission mode. Therefore, driving response quickly changes so as to correspond to the driving operation of the driver.

The ECU 30 may set the upper limit speed Lim only in the manual transmission mode (M position) and does not need to set the upper limit speed in the automatic transmission mode (D position). The ECU 30 may set the upper limit speed Lim only in the normal mode and does not need to set the upper limit speed Lim in the sport mode. This simplifies the control and reduces process steps.

The ECU 30 may set the upper limit speed Lim without considering the gear ST.

The automatic transmission 13 may be a continuously variable transmission that changes the transmission gear ratio SR in a continuous manner. In other words, the automatic transmission 13 does not need to be a multiple-stages transmission but may change the transmission gear ratio SR in some stages by the driver's manual operation.

The automatic transmission 13 may be configured such that the upper limit of the gear ST at the highest gear and the smallest value of the transmission gear ratio SR are changed by the manual operation of the operation member.

The invention claimed is:

1. A controller of an automatic transmission, wherein the controller includes a first control mode and a second control mode for controlling a transmission gear ratio of the automatic transmission device, wherein the controller automatically changes the transmission gear ratio when in the second control mode, wherein the automatic transmission is mounted in a vehicle, wherein the vehicle has an internal combustion engine, an axle, and an operation member, and the internal combustion engine has an engine output shaft, wherein the automatic transmission has a transmission output shaft, wherein the controller obtains an index value and upper limit speed of rotation speed of the transmission output shaft, wherein the automatic transmission is provided between the engine output shaft and the axle, wherein, in the first control mode, the controller allows the transmission gear ratio to be changed if the operation member is operated to increase the transmission gear ratio and the index value is equal to or smaller than the upper limit speed, wherein the controller has a setting section for setting the upper limit speed, and wherein, when the controller is in the first control mode and the operation member is operated to increase the transmission gear ratio, the setting section detects vehicle acceleration of the vehicle and sets the upper limit speed to be greater as the vehicle acceleration becomes smaller.

2. The controller according to claim 1, wherein the setting section sets the upper limit speed to be smaller as the transmission gear ratio becomes greater.

3. The controller according to claim 1, wherein the first control mode is a manual transmission mode, in which the transmission gear ratio is changed according to the manual operation of the operation member, and wherein the second control mode is an automatic transmission mode, in which the controller automatically changes the transmission gear ratio according to the running state of the vehicle.

4. The controller according to claim 1, wherein the automatic transmission device is a multistage type having a plurality of gears, wherein the operation member is operated to change the gear, and wherein increase of the transmission gear ratio indicates that the gear is changed to be lower gear.

* * * * *